United States Patent
Turpin et al.

(10) Patent No.: US 9,437,348 B2
(45) Date of Patent: Sep. 6, 2016

(54) ELECTRICAL INSULATION MATERIAL

(75) Inventors: Robert H. Turpin, Hill, NH (US); David S. Stankes, New Hampton, NH (US); Martin H. Fox, Sanbornton, NH (US); Mitchell T. Huang, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 565 days.

(21) Appl. No.: 13/069,679

(22) Filed: Mar. 23, 2011

(65) Prior Publication Data

US 2012/0156956 A1 Jun. 21, 2012

Related U.S. Application Data

(60) Provisional application No. 61/424,354, filed on Dec. 17, 2010.

(51) Int. Cl.
| | | |
|---|---|---|
| *H01B 3/52* | (2006.01) | |
| *B32B 5/02* | (2006.01) | |
| *B32B 5/26* | (2006.01) | |
| *B32B 19/06* | (2006.01) | |
| *D21H 13/26* | (2006.01) | |
| *D21H 17/67* | (2006.01) | |
| *D21H 13/10* | (2006.01) | |
| *D21H 21/18* | (2006.01) | |

(52) U.S. Cl.
CPC ............ *H01B 3/52* (2013.01); *B32B 5/024* (2013.01); *B32B 5/26* (2013.01); *B32B 19/06* (2013.01); *D21H 13/26* (2013.01); *D21H 13/10* (2013.01); *D21H 17/67* (2013.01); *D21H 21/18* (2013.01); *Y10T 442/608* (2015.04); *Y10T 442/659* (2015.04); *Y10T 442/693* (2015.04)

(58) Field of Classification Search
CPC ......... B32B 19/06; B32B 5/02; B32B 5/022; B32B 5/26; D21H 13/26; D21H 17/67; D21H 21/18; Y10T 442/608; Y10T 442/659; Y10T 442/693
USPC ....... 442/327, 381, 385, 389, 412, 417, 375, 442/393
See application file for complete search history.

(56) References Cited

U.S. PATENT DOCUMENTS

| | | | |
|---|---|---|---|
| 3,309,260 A | 3/1967 | Boese | |
| 3,523,061 A | 8/1970 | Purvis et al. | |
| 3,686,062 A | 8/1972 | Romanin | |
| 3,814,622 A * | 6/1974 | Isshiki et al. | 442/117 |
| 4,096,313 A | 6/1978 | Fujita et al. | |
| 4,259,398 A | 3/1981 | Seino et al. | |
| 4,273,825 A | 6/1981 | Nishiyama et al. | |
| 4,726,987 A * | 2/1988 | Trask et al. | 442/373 |
| 5,246,772 A | 9/1993 | Manning | |
| 5,478,640 A * | 12/1995 | Berbner et al. | 442/327 |
| 5,622,775 A | 4/1997 | Burks, Jr. et al. | |
| 5,721,397 A | 2/1998 | Weinberg | |
| 5,723,020 A | 3/1998 | Robinson | |
| 6,312,561 B1 * | 11/2001 | Forsten et al. | 162/145 |
| 6,443,257 B1 | 9/2002 | Wiker | |
| 6,855,404 B2 | 2/2005 | Anderson et al. | |
| 7,335,275 B2 | 2/2008 | Anderson et al. | |
| 7,927,461 B2 | 4/2011 | Yokura et al. | |
| 2004/0115422 A1 | 6/2004 | Levit et al. | |
| 2005/0274472 A1 | 12/2005 | Steif | |
| 2006/0003659 A1 | 1/2006 | Kawka et al. | |
| 2007/0011693 A1 | 1/2007 | Creasy | |
| 2007/0087178 A1 | 4/2007 | Hendriks et al. | |
| 2008/0064279 A1 | 3/2008 | Browning et al. | |
| 2008/0145600 A1 | 6/2008 | Hendren | |
| 2008/0286591 A1 | 11/2008 | Hollberg et al. | |
| 2009/0029885 A1 | 1/2009 | Conley et al. | |
| 2010/0147555 A1 | 6/2010 | Laura, Jr. et al. | |
| 2012/0111627 A1 | 5/2012 | Kato | |
| 2012/0156956 A1 | 6/2012 | Turpin | |

FOREIGN PATENT DOCUMENTS

| | | | |
|---|---|---|---|
| CA | 2003221 | 5/1990 | |
| EP | 0122967 | 10/1987 | |
| GB | 1544044 | 4/1979 | |
| JP | 56159015 | 12/1981 | |
| JP | 57138718 | 8/1982 | |
| JP | 62035841 | * 2/1987 | ............ B32B 18/00 |
| JP | H07-032549 | 2/1995 | |
| JP | H07-299891 | 11/1995 | |
| JP | 9158092 | 6/1997 | |
| JP | H10-112218 | 4/1998 | |
| JP | 2000008299 | 1/2000 | |
| JP | 200115547 | 6/2001 | |
| JP | 3267815 | 1/2002 | |
| JP | 2002051492 | 2/2002 | |
| JP | 2006-022432 | * 1/2006 | ............ D21H 13/12 |
| JP | 2006-509661 | 3/2006 | |
| WO | WO 8911151 | 11/1989 | |
| WO | WO 2004/031466 | 4/2004 | |
| WO | WO 2012/082180 | 6/2012 | |

OTHER PUBLICATIONS

DERWENT 2006-158441; DERWENT Week 201075; Abst for Mogi et al JP 2006-022432.*
IPT Technical Reference Guide, Innovative Paper Technologies, LLC, URL <www.iptllc.net/insulation/IPTTechRefGuide.pdf>.
Product Data Sheet, Innovative Paper Technologies, LLC, URL <http://www.iptllc.net/insulation/ThermaVoltDS.pdf>.
El DuPont de Nemours & Co. et al., Calendered Spunlaced Nomex Aramid Sheets, Research Disclosure, Mason Publications, Feb. 1, 1975, vol. 130, No. 2.
International Search Report for PCT/US2011/037755, issued Aug. 23, 2011.
PCT/US2013/030200, International Search Report, Jun. 21, 2013.

* cited by examiner

*Primary Examiner* — Jennifer A Steele
(74) *Attorney, Agent, or Firm* — Gregg H. Rosenblatt

(57) ABSTRACT

Provided in at least one embodiment is a nonwoven paper layer directly fused on one or both sides with a nonwoven fabric layer wherein one or both of the nonwoven paper and nonwoven fabric are electrically insulating.

13 Claims, No Drawings

ELECTRICAL INSULATION MATERIAL

CROSS REFERENCE TO RELATED APPLICATION

This application claims the benefit of U.S. Provisional Patent Application No. 61/424,354, filed Dec. 17, 2010, the disclosure of which is incorporated by reference herein in its entirety.

TECHNICAL FIELD

This invention relates to materials suitable for electrical insulation applications.

BACKGROUND

Electrical equipment such as electric motors, generators, and transformers often require some form of dielectric insulation to separate a conductor at one voltage from a conductor at a different voltage and/or to provide mechanical protection to electrical components. Laminates of electrical insulation materials are often used in the industry for this purpose.

SUMMARY

The materials of the present invention are suitable for insulating electrical components in transformers, motors, generators, and other devices requiring insulation of electrical components.

At least one embodiment of the present invention provides an article comprising a nonwoven paper layer directly fused on one or both sides with a nonwoven fabric layer wherein one or both of the nonwoven paper and nonwoven fabric are electrically insulating.

At least one embodiment of the present invention provides an electrical insulating material that synergistically combines the mechanical reinforcement properties of nonwoven fabrics with the dielectric insulation properties of nonwoven papers.

At least one embodiment of the present invention provides an electrical insulating material comprising a short fiber based nonwoven paper reinforced with outer long fiber based nonwoven fabric layers. In at least some embodiments of the present invention, thermal bonding and densification of the component materials result in an electrical insulating material having a desirable balance of properties including dielectric strength, tensile strength, and tear strength.

As used in this specification:

"directly fused" means having no intervening layer such as an adhesive layer;

"nonwoven paper" means a sheet material primarily comprised of short fibers;

"nonwoven fabric" means a sheet material primarily comprised of long fibers;

"short fibers" means fibers less than one inch long;

"long fibers" means fibers greater than or equal to one inch long;

"MD" or "machine direction" refers to the direction parallel to the windup direction of a continuous sheet of material; and "CD" or "cross direction" refers to the direction perpendicular to the windup direction of a continuous sheet of material.

An advantage of at least one embodiment of the present invention is that the thermal bonding of the nonwoven paper and nonwoven fabric layers is done without the need for adhesive resins. This avoids the extra step and cost of adding adhesive and eliminates the risk of an adhesive becoming brittle from exposure to high temperatures during processing and use.

An advantage of at least one embodiment of the present invention is that the thermal bonding of the nonwoven paper and nonwoven fabric layers is accomplished without the need for thermoplastic film. This avoids the extra step and cost of including a thermoplastic film.

An advantage of at least one embodiment of the present invention is that the thermal bonding of the nonwoven paper and nonwoven fabric layers is accomplished without the need for plasma treatments (to enhance adhesion of the layers). This avoids the extra step and cost of plasma treatment.

The above summary of the present invention is not intended to describe each disclosed embodiment or every implementation of the present invention. The detailed description that follows below more specifically illustrates embodiments of the invention.

DETAILED DESCRIPTION

In the following description, it is to be understood that other embodiments are contemplated and may be made without departing from the scope or spirit of the present invention. The following detailed description, therefore, is not to be taken in a limiting sense. Unless otherwise indicated, all numbers expressing feature sizes, amounts, and physical properties used in the specification and claims are to be understood as being modified in all instances by the term "about." Accordingly, unless indicated to the contrary, the numerical parameters set forth in the present specification and attached claims are approximations that can vary depending upon the desired properties sought to be obtained by those skilled in the art utilizing the teachings disclosed herein. The use of numerical ranges by endpoints includes all numbers and any value within that range (e.g., 1 to 5 includes 1, 1.5, 2, 2.75, 3, 3.80, 4, and 5).

At least some embodiments of the present invention provide a unique flexible electrical insulation article having improved mechanical strength and resistance to high temperatures.

The nonwoven paper layer of at least some embodiments of the present invention comprises a sheet material made of short fibers, i.e., fibers less than one inch (2.54 cm) long. In at least one embodiment of the present invention, the majority of the fibers in the nonwoven paper are organic. However, some embodiments may include nonwoven papers with inorganic fibers.

Examples of suitable organic fibers for making the nonwoven paper include, but are not limited to, aramid fibers, including meta-aramid fibers such as those available under the trade designations NOMEX from DuPont (www2.dupont.com); under the trade designation TEIJIN-CONEX from Teijin Limited, Japan; under the trade designation METASTAR from Yantai, China; and under the trade designation X-FIPER from SRO Group, China and para-aramid fibers such as those available under the trade designations TWARON from Teijin Limited, Japan; under the trade designations KEVLAR from DuPont (www2.dupont.com); under the trade designation KERMEL TECH from Kermel, France, and under the trade designation HERACRON from Kolon Industries, South Korea. In at least some embodiments of the present invention, nonwoven papers may include one or both of meta-aramid and para-aramid fibers. In at least one embodiment of the present invention, aramid fibers are a preferred component of the nonwoven paper layer. At least some embodiments of nonwoven papers of the present invention may include one or more types of aramid fibers. The types of aramid fibers include, but are not limited to, meta-aramid, para-aramid, modified meta- or para-aramids, or other types of aramids. The nonwoven paper may comprise aramid fibers in an amount of 0 (zero) to 100 wt %. In at least one embodiment of the present invention, the nonwoven paper layer comprises about 10 wt % to about 30 wt % aramid fibers.

Suitable non-aramid organic and inorganic fibers include, but are not limited to, polyphenylene sulfide (PPS), polyester, polyamides, acrylic, melamine, glass, polyolefin, and polyimide. The nonwoven paper may comprise non-aramid fibers in an amount of 0 (zero) to 100 wt %. In at least one embodiment of the present invention, the nonwoven paper layer comprises about 1 wt % to about 10 wt % non-aramid fibers.

In at least one embodiment of the present invention, the nonwoven paper also comprises a polymeric binder. Suitable polymeric binders include, but are not limited to, acrylic, nitrile, styrene acrylic latex, guar gum, starch, and natural rubber latex. The nonwoven paper may comprise polymeric binder in an amount up to about 20 wt %. In at least one embodiment of the present invention, the nonwoven paper layer comprises about 3 wt % to about 10 wt % polymeric binder.

In at least one embodiment of the present invention, the nonwoven paper also comprises one or more inorganic fillers. Suitable inorganic fillers include, but are not limited to, kaolin clay, talc, mica, calcium carbonate, alumina trihydrate, montmorillonite, smectite, bentonite, illite, chlorite, sepiolite, attapulgite, halloysite, vermiculite, laponite, rectorite, perlite, aluminum nitride, silicon carbide, boron nitride, and combinations thereof. Suitable types of kaolin clay include, but are not limited to, water-washed kaolin clay; delaminated kaolin clay; calcined kaolin clay; and surface-treated kaolin clay. The nonwoven paper may comprise inorganic filler in an amount up to about 80 wt %. In at least one embodiment, the nonwoven paper comprises about 50 wt % to about 80 wt % inorganic filler.

In at least one embodiment of the present invention, the nonwoven paper comprises aramid fibers in an amount of about 10 wt % to about 30 wt %, non-aramid fibers in an amount of about 1 wt % to about 10 wt %, a polymeric binder in an amount of about 3 wt % to about 10 wt %, and inorganic filler in an amount of about 50 wt % to about 80 wt %.

The nonwoven papers of the present invention may be manufactured by any suitable method known in the art. Typical methods include wet forming (wet-laid) processes typically used with fibers shorter than one inch. The shorter fibers used in wet forming processes typically result in nonwoven papers with dense structures having good dielectric insulation properties. In wet forming methods, the fibers/fillers/binders are typically dispersed into water, and the resulting mixture is described as stock or slurry. The stock is deposited on a continuously moving screen to form a web. One suitable method is to use a cylinder-style paper machine in which the fibers/fillers/binders are heavily diluted with water. Ionically charged flocculants and coagulants can be used to neutralize the mixture and retain fillers and binders. This method typically results in a uniform distribution of fibers/fillers/binders in the nonwoven paper. The web is then transferred to belts and dried on heated drums.

Examples of commercially available nonwoven papers suitable for use in the present invention includes those available from 3M Company, USA, under the trade designations CeQUIN, including but not limited to CeQUIN I (about 90% inorganic content), CeQUIN II (two-layer (ply) composites of CeQUIN I), CeQUIN X (enhanced wet strength for B-stage applications), and CeQUIN 3000 (about 74% inorganic content plus organic fiber reinforcement); and THERMAVOLT including, but not limited to, THERMAVOLT calendered insulation paper, THERMAVOLT TVF calendered insulation paper with film, and THERMAVOLT LNC uncalendered insulation paper; those available from DuPont (www2.dupont.com) under the trade designation NOMEX, including but not limited to NOMEX Paper Type 410, Type 411 (lower density version), Type 414, Type 418 (includes mica), Type 419 (lower density version of Type 418), and Type E56; those available from SRO Group (China) Limited under the trade designation X-FIPER; those available from Yantai Metastar Special Paper Co., Ltd., China, under the trade designation METASTAR; and those available from Interface Solutions, USA, under the trade designation VOLTOID, including but not limited to VOLTOID D-100 FR, VOLTOID D-225 FR, VOLTOID D-800, VOLTOID HP-450, VOLTOID S-350, and VOLTOID V-090.

The nonwoven fabric layer of at least some embodiments of the present invention comprises a sheet material made of long fibers, i.e., fibers greater than or equal to one inch (2.54 cm) long.

Nonwoven fabric layers are typically made primarily of organic fibers but can contain inorganic fibers. Examples of suitable organic fibers for making the nonwoven fabric include, but are not limited to, aramid fibers, including meta-aramid and para-aramid fibers. At least some embodiments of nonwoven fabrics suitable for use in the present invention may include one or both of meta-aramid and para-aramid fibers. In at least one embodiment of the present invention, aramid fibers are a preferred component of the nonwoven fabric layer. At least some embodiments of nonwoven fabrics of the present invention may include one or more types of aramid fibers. The types of aramid fibers include, but are not limited to, meta-aramid, para-aramid, modified meta- or para-aramids, or other types of aramids. The nonwoven fabric may comprise aramid fibers in an amount 0 (zero) to 100 wt %. In at least one embodiment, the nonwoven fabric comprises about 20 wt % to about 70 wt % aramid fibers.

Suitable non-aramid organic fibers include, but are not limited to polyphenylene sulfide (PPS), polyesters including polyethylene terephthalate (PET) and poly(cyclohexylene-dimethylene terepthalate) (PCT), glycol-modified polyester, polyphenyl sulfone, polyamide (nylon), and polypropylene fibers. The nonwoven fabric may comprise non-aramid fibers in an amount of about 0 (zero) to 100 wt %. In at least one embodiment, the nonwoven fabric comprises about 30 wt % to about 80 wt % non-aramid fibers.

Nonwoven fabrics suitable for use in the present invention may comprise staple (i.e., non-binding) fibers and binder fibers. Staple fibers may include, for example, meta-aramid and para-aramid, polyphenylene sulfide (PPS), polyesters including polyethylene terephthalate (PET), glycol-modified polyester, polyphenyl sulfone, nylon, and polypropylene fibers. Binder fibers may include, for example, meta-aramid, polyphenylene sulfide (PPS), polyesters including polyester terephthalate (PET) and poly(cyclohexylene-dimethylene tereptalate)(PCT), glycol-modified polyester, polyphenyl sulfone, and polypropylene fibers. Typically, the binder fibers will soften and/or flow upon the application of heat and/or pressure, which allows them to bond with the staple fibers. Binder fibers may comprise a single polymer and/or a bicomponent configuration with 2 polymers having different chemical and/or physical properties.

For nonwoven fabrics suitable for use in the present invention made with staple fibers and binder fibers, staple fibers may comprise about 30 wt % to about 80 wt % of the fabric and binder fibers may comprise about 20 wt % to about 70 wt % of the fabric.

In some embodiments of the present invention, instead of, or in addition to, using binder fibers, the nonwoven fabrics may contain bonding agents to promote bonding of materials within the nonwoven fabric. Other means of bonding or strengthening the nonwoven fabrics include hydro-entangling, point bonding, or calendering.

The fibers are typically blended together to form the nonwoven fabric. The ability to blend different fibers allows greater design flexibility to meet product performance when compared to prior art methods such as laminating nonwoven paper to a continuous polyester film to increase paper strength.

The nonwoven fabrics typically comprise a network of fibers forming a flexible sheet material producible without weaving or knitting and held together by either (i) mechanicallyinterlocking at least some of the fibers, (ii) fusing at least some parts of some of the fibers, or (iii) bonding at least some of the fibers by use of a bonding material. Prior to bonding or fusing some of the fibers, the nonwoven fabric may resemble batting, a soft bulky assembly of fibers.

The nonwoven fabrics may be in any suitable form such as, but not limited to, carded nonwoven webs, spunbonded webs, melt blown webs, scrims, cloths, unidirectional webs, felts, spunlaced webs, hydrolaced webs, and the like.

In at least one embodiment, a carded nonwoven web may include about 20 wt % to about 70 wt % of blends of aramid fibers and about 30 wt % to about 80 wt % of other non-aramid fibers.

The nonwoven fabrics of the present invention can be made by any suitable method known in the art. Typical methods include dry forming (dry-laid) processes used with fibers typically equal to or longer than one inch. The longer fibers used in dry forming processes typically result in nonwoven fabrics with open, porous structures having good mechanical strength. Examples of dry forming processes include carding and spunbonding. In a typical dry forming carding process, clumps of staple fibers are separated mechanically into individual fibers and formed into a coherent web. A carding machine uses opposed moving beds of closely spaced needles to pull and separate the clumps. To be grasped by the needles, the input fibers used in carding are typically crimped, i.e., made wavy.

Commercially available nonwoven fabrics suitable for use in the present invention includes those available from 3M Company, under the trade designations THERMAL SHIELD (a nonwoven PPS material) and those available from DuPont (www2.dupont.com) under the trade designation NOMEX LT, including but not limited to Type 180.

In at least one embodiment of the present invention, a nonwoven paper layer is directly fused to one nonwoven fabric layer. In at least one other embodiment, a nonwoven paper layer is placed between two nonwoven fabric layers and directly fused to the two nonwoven fabric layers.

The nonwoven paper and nonwoven fabric layers may comprise one or more sheets, i.e., plies or sub-layers, which are combined to form the layer. The plies or sub-layers may be the same or different materials. The sheets may be combined by any suitable means such as using a chemical adhesive or by processes such as calendering. For example, a sheet of CeQUIN I may comprise a layer. A sheet of CeQUIN II, which is a two-sheet (two-ply) composite of CeQUIN I, may also comprise a layer.

In at least one embodiment, the nonwoven paper layer and nonwoven fabric layer or layers are fused together by mechanical and thermal bonding through heat and pressure by means of a hot calender stack. The calendering parameters may be manipulated to influence the physical properties of the resulting article such that targeted properties are achieved. For example, increasing the calendering temperature, pressure, and speed can influence physical properties of the resulting insulating article such as MD Tensile Strength, CD and MD Tear Strength, and Retained Heat Aged MD Tensile Strength and Elongation, as shown in some of the Examples. Fiber orientation of nonwoven fabrics may also be modified to achieve target properties. In making the articles of the present invention, no adhesive (i.e., beyond what may have been used in forming a nonwoven paper or fabric layer) is applied to join the various layers or sub-layers together. Instead, the nonwoven paper layer and nonwoven fabric layer(s) are bonded by calendering with only heat and pressure unlike insulating products known in the art which require the presence of a thermoplastic layer in the construction, the addition of an adhesive between layers, or adhesion enhancing surface-treatments such as plasma treatments.

The formulation of the nonwoven fabric can also be designed to bond to, or to facilitate integration with, the nonwoven paper so that an adhesive need not be applied. For example, the presence of binder fibers, bonding agents, or spunbonded (thermoplastic) fibers in a nonwoven fabric layer can cause the nonwoven paper and fabric layers to bond together upon the application of heat and/or pressure.

The nonwoven paper layer and nonwoven fabric layer(s) may be formed and combined or integrated in a continuous process (inline integration) or in discrete steps (offline integration).

As previously stated, the articles of the present invention are suitable for insulating electrical components in transformers, motors, generators, and other devices requiring insulation of electrical components. Requirements of different product applications can be addressed with different combinations of the nonwoven papers and nonwoven fabrics of the present invention. For example, the weight ratios of the nonwoven paper and nonwoven fabric can be adjusted. For at least some articles of the present invention, the nonwoven paper layer(s) comprise(s) about 49 wt % to about 95 wt % and the nonwoven fabric layer(s) comprise(s) about 5 wt % to about 51 wt %. For at least some articles of the present invention having one nonwoven paper layer and one nonwoven fabric layer, the nonwoven paper layer comprises about 66 wt % to about 95 wt % and the nonwoven fabric layer comprises about 5 wt % to about 34 wt %. For at least some articles of the present invention having one nonwoven paper layer and two nonwoven fabric layers, the nonwoven paper layer comprises about 49 wt % to about 93 wt % and the nonwoven fabric layers comprise about 7 wt % to about 51 wt %. For at least some articles of the present invention having two nonwoven paper layers and two nonwoven fabric layers, the nonwoven paper layers comprise about 66 wt % to about 95 wt % and the nonwoven fabric layers comprise about 5 wt % to about 34 wt %.

Each layer of the insulating article can contribute to the unique properties of the final construction. For example, the nonwoven paper can provide long term heat resistance, and desirable electrical properties; the nonwoven fabric can provide excellent resistance to tear, while also enhancing tensile strength and overall flexibility after heat aging. The combination of the two types of layers provides an article having both physical strength, and desirable electrical properties, while maintaining excellent flexibility after high temperature heat aging at about 464° F. (240° C.).

In at least some embodiments of the present invention, the insulating article has a dielectric breakdown strength of greater than 100 volts/mil (3.9 kilovolts/mm), preferably greater than or equal to 150 V/mil (5.9 kV/mm), when measured according to ASTM D149-09.

EXAMPLES

The following examples and comparative examples are offered to aid in the understanding of the present invention and are not to be construed as limiting the scope thereof. Unless otherwise indicated, all parts and percentages are by weight. The following test methods and protocols were employed in the evaluation of the illustrative and comparative examples that follow.

Materials List

| PRODUCT NAME | DESCRIPTION | SOURCE |
| --- | --- | --- |
| CeQUIN I | Insulating Nonwoven Paper | 3M Company, USA |
| CeQUIN 3000 | Insulating Nonwoven Paper | 3M Company, USA |
| CeQUIN X | Insulating Nonwoven Paper | 3M Company, USA |
| THERMAVOLT | Calendered Insulating Nonwoven Paper | 3M Company, USA |
| THERMAVOLT LNC | Uncalendered Insulating Nonwoven Paper | 3M Company, USA |
| THERMAVOLT TVF, thickness 5 + 1 | Calendered Insulating Nonwoven Paper Laminated to 1 mil Polyester Film Layer | 3M Company, USA |
| NOMEX 411 | Insulating Nonwoven Paper | DuPont, USA |

Test Methodologies

| PROPERTY | TEST METHOD | TITLE |
| --- | --- | --- |
| Thickness | ASTM D-645/645M-97 (2007) | Standard Test Method for Thickness of Paper and Paperboard |
| Basis Weight | ASTM D-646-96 (2007) | Standard Test Method for Grammage of Paper and Paperboard (Mass per Unit Area) |
| MD Tensile Strength | ASTM D-828-97 (2002) | Standard Test Method for Tensile Properties of Paper and Paperboard Using Constant-Rate-of-Elongation Apparatus |
| MD Elongation | ASTM D-828-97 (2002) | Standard Test Method for Tensile Properties of Paper and Paperboard Using Constant-Rate-of-Elongation Apparatus |
| CD Tear Strength | Tappi T-414 om-04 | Internal Tearing Resistance of Paper (Elmendorf-Type Method) |
| MD Tear Strength | Tappi T-414 om-04 | Internal Tearing Resistance of Paper (Elmendorf-Type Method) |
| Dielectric Breakdown Strength | ASTM-D149-09 | Standard Test Method for Dielectric Breakdown Voltage and Dielectric Breakdown Strength of Solid Electrical Insulating Materials at Commercial Power Frequencies |
| Retained Heat Aged MD Tensile Strength | Samples were placed in an oven and exposed to 464° F. (240° C.) for 2 weeks. Samples were then cooled to room temperature and tested according to ASTM D828-97 (2002). | |
| Retained Heat Aged MD Elongation | Samples were placed in an oven and exposed to 464° F. (240° C.) for 2 weeks. Samples were then cooled to room temperature and tested according to ASTM D828-97 (2002). | |

Experimental Nonwoven Paper, XP-1:

XP-1 is an experimental electrically insulating nonwoven paper made using methods known in the art, as follows:

A mixture of 76 wt % delaminated kaolin clay (HYDRAPRINT, KaMin, LLC, USA), 7 wt % acrylic latex binder (HYCAR 26362, The Lubrizol Corp., USA), 10 wt % m-aramid pulp (Aramid, Ltd., USA), 5.5 wt % p-aramid fiber (1.7 denier×6 mm) (TWARON, Teijin Aramid, The Netherlands), and 1.5 wt % acrylic fiber (0.1 denier×3 mm) (VONNEL 1 MVP, Mitsubishi Rayon Co., Japan) was dispersed in water to form a slurry with a solids content of about 0.06%-0.9% by weight. A wet nonwoven paper was then formed by draining the water on a paper machine.

The formed nonwoven paper was pressed between papermaking wet felt at a pressure of 300 lb/linear inch (54 kg/cm). At this point, the nonwoven paper had sufficient strength to be moved to the dryer section of papermaking process. The wet nonwoven paper was then further dried through contact drying. Steam heated dryer cans or a laboratory handsheet dryer at temperatures of 250° F. (121° C.) were used to dry the nonwoven paper to a moisture content less than 1.5 wt %.

Nonwoven Fabric:

The nonwoven fabrics used in Examples 1-18 and Comparative Example CE11 consisted of a mixture of 40 wt % p-aramid fibers (1.7 denier×1.5") (TWARON, Teijin Aramid, The Netherlands), 10 wt % polyester staple fibers (1.5 denier×1.5") (Type 221, Invista, USA), 25 wt % undrawn polyester binder fiber (3 denier×1") (Type 109, Fiber Innovation Technology, USA), and 25 wt % bicomponent polyester binder fiber (2 denier×1.5") with a 110° C. bonding amorphous outer sheath (Type T-201, Fiber Innovation Technology, USA). The fiber mixture was passed through a carding machine to yield nonwoven battings with basis weights between 0.033-0.066 lb/sq yd (18-36 g/sq m).

The nonwoven batting was then calendered through a steel cotton nip, with the steel roll heated to a temperature around 230-240° F. (110-116° C.) and a nip pressure around 590 pli (106 kg/cm). Examples 1-13, 16, and CE11 used a nonwoven fabric with a basis weight of 0.044 lb/sq yd (24 g/sq m), while Example 14 used a nonwoven with a 0.033 lb/sq yd (18 g/sq m) basis weight. Examples 15 and 17 used a nonwoven fabric with a basis weight of 0.066 lb/sq yd (36 g/sq m). Example 18 used a nonwoven fabric with a basis weight of 0.05 lbs/sq yd (26 g/sq m).

The nonwoven fabric used in Examples 19-22 had a basis weight of about 0.04 lb/sq yd (22 g/sq m) and consisted of a mixture of p-aramid fibers (1.7 denier×1.5") (TWARON, Teijin Aramid, The Netherlands), polyester staple fibers (1.5 denier×1.5") (Type 221, Invista, Wichita, Kans.), and undrawn polyester binder fiber (3 denier×1") (Type 109, Fiber Innovation Technology, Johnson City, Tenn.) in the amounts shown in Table 5. The fiber mixture was passed through a carding machine to yield nonwoven batting. The nonwoven batting was then point bonded with an embossed roll using a surface temperature around 240° F. (116° C.) and pressed against a cotton nip roll with a nip pressure of around 400 pli (71.6 kg/cm).

Comparative Examples CE1 to CE9

Comparative Examples CE1 to CE9 were made with only nonwoven paper layers, i.e., no nonwoven fabric layers. Comparative Examples CE1 to CE7 used commercially available nonwoven papers with the sources noted in the Materials List. The CE8 sample was made by calendering the NOMEX 411, commercially available as an uncalendered nonwoven paper, between steel rolls at a temperature of 380° F. (193° C.), a pressure of 1000 pli (179 kg/cm), and a speed of 15 ft/min (4.6 m/min). The CE9 sample was made by calendering the XP-1 nonwoven paper, which was laboratory produced as described above, between steel rolls at a temperature of 300° F. (149° C.), a pressure of 1000 pli (179 kg/cm), and a speed of 15 ft/min (4.6 m/min). The measurements and test results for CE1 to CE9 are shown in Table 1.

TABLE 1

| EXAMPLE | CE1 | CE2 | CE3 | CE4 | CE5 |
|---|---|---|---|---|---|
| Nonwoven Paper | CeQUIN I | CeQUIN X | CeQUIN 3000 | THERMA-VOLT | THERMA-VOLT |
| Thickness | 5.25 mil (0.13 mm) | 5.0 mil (0.13 mm) | 5.0 mil (0.13 mm) | 5.0 mil (0.13 mm) | 7.0 mil (0.18 mm) |
| Basis Weight | 0.24 lb/yd2 (130 g/m2) | 0.19 lb/yd2 (103 g/m2) | 0.19 lb/yd2 (103 g/m2) | 0.34 lb/yd2 (185 g/m2) | 0.49 lb/yd2 (264 g/m2) |
| Density | 61 lb/ft3 (0.98 g/cc) | 50 lb/ft3 (0.80 g/cc) | 50 lb/ft3 (0.80 g/cc) | 91 lb/ft3 (1.46 g/cc) | 93 lb/ft3 (1.49 g/cc) |
| MD Tensile Strength | 7.5 lb/in (13 N/cm) | 16 lb/in (28 N/cm) | 16 lb/in (28 N/cm) | 36 lb/in (63 N/cm) | 40 lb/in (70 N/cm) |
| MD Elongation | 1% | 1.3% | 1.5% | 1.6% | 2.8% |
| CD Tear Strength | 0.14 lb (64 g) | 0.247 lb (112 g) | 0.16 lb (72 g) | 0.335 lb (152 g) | 0.485 lb (220 g) |
| MD Tear Strength | 0.070 lb (32 g) | 0.14 lb (64 g) | 0.070 lb (32 g) | 0.255 lb (116 g) | 0.352 lb (160 g) |
| Dielectric Breakdown Strength | 251 V/mil (9.9 kV/mm) | 185 V/mil (7.3 kV/mm) | 214 V/mil (8.4 kV/mm) | 500 V/mil (19.7 kV/mm) | 500 V/mil (19.7 kV/mm) |
| Retained Heat Aged MD Tensile Strength | 3.2 lb/in (5.6 N/cm) | 1.2 lb/in (2.1 N/cm) | 2.7 lb/in (4.7 N/cm) | 9.5 lb/in (16 N/cm) | 12.9 lb/in (22.6 N/cm) |
| Retained Heat Aged MD Elongation | 0.23% | 0% | 0% | 0.5% | 0.6% |

| EXAMPLE | CE6 | CE7 | CE8 | CE9 |
|---|---|---|---|---|
| Nonwoven Paper | THERMA-VOLT | THERMA-VOLT | NOMEX 411 | XP-1 |
| Thickness | 10 mil (0.25 mm) | 3.0 mil (0.08 mm) | 3.9 mil (0.10 mm) | 5.2 mil (0.13 mm) |
| Basis Weight | 0.71 lb/yd2 (386 g/m2) | 0.19 lb/yd2 (103 g/m2) | 0.15 lb/yd2 (81 g/m2) | 0.33 lb/yd2 (181 g/m2) |
| Density | 95 lb/ft3 (1.52 g/cc) | 84 lb/ft3 (1.35 g/cc) | 52 lb/ft3 (0.83 g/cc) | 85 lb/ft3 (1.36 g/cc) |
| MD Tensile Strength | 44 lb/in (77 N/cm) | 17 lb/in (30 N/cm) | 26 lb/in (45 N/cm) | 28 lb/in (50 N/cm) |
| MD Elongation | 0.9% | 1.2% | 4.9% | 1.2% |
| CD Tear Strength | 1.07 lb (484 g) | 0.154 lb (70 g) | 0.705 lb (320 g) | 0.476 lb (216 g) |
| MD Tear Strength | 0.829 lb (376 g) | 0.093 lb (42 g) | 0.459 lb (208 g) | 0.370 lb (168 g) |
| Dielectric Breakdown Strength | 500 V/mil (19.7 kV/mm) | 400 V/mil (15.7 kV/mm) | 690 V/mil (27.2 kV/mm) | 293 V/mil (11.5 kV/mm) |
| Retained Heat Aged MD Tensile Strength | 18.2 lb/in (31.9 N/cm) | 6 lb/in (10 N/cm) | 35.4 lb/in (61.9 N/cm) | 7.7 lb/in (13.5 N/cm) |
| Retained Heat Aged MD Elongation | 0.5% | 0.5% | 6.7% | 0.5% |

Examples 1 to 7

Examples 1 to 7 include a nonwoven paper layer between two nonwoven fabric layers.

For Examples 1 to 6, the nonwoven paper layer was fed between two nonwoven fabric layers and calendered between steel rolls at the conditions shown in Table 2.

Example 7 included an XP-1 nonwoven paper layer that was calendered prior to integration with the nonwoven fabric layers. Calender conditions for this XP-1 nonwoven paper were 300° F. (149° C.) nip temperature, 1000 pli (179 kg/cm) nip pressure between steel rolls, and 15 ft/min (4.6 m/min) speed. The calendered XP-1 nonwoven paper was fed between two nonwoven fabric layers and then calendered between steel rolls at the conditions shown in Table 2. The measurements and test results for Examples 1 to 7 are shown in Table 2.

TABLE 2

| EXAMPLE | 1 | 2 | 3 | 4 |
|---|---|---|---|---|
| Nonwoven Paper | CeQUIN I | CeQUIN X | CeQUIN 3000 | THERMAVOLT LNC |
| No. of Nonwoven Fabric Layers | 2 | 2 | 2 | 2 |
| Nonwoven Paper Thickness | 5.0 mil (0.13 mm) | 5.0 mil (0.13 mm) | 5.0 mil (0.13 mm) | 5.0 mil (0.13 mm) |
| Composite Calendering Temperature | 350-360° F. (177-182° C.) | 350-360° F. (177-182° C.) | 350-360° F. (177-182° C.) | 370-390° F. (188-199° C.) |
| Composite Calendering Pressure | 700 pli (125 kg/cm) | 700 pli (125 kg/cm) | 700 pli (125 kg/cm) | 1000 pli (179 kg/cm) |
| Composite Calendering Speed | 15 ft/min (4.6 m/min) | 15 ft/min (4.6 m/min) | 15 ft/min (4.6 m/min) | 15 ft/min (4.6 m/min) |
| Composite Thickness | 5.55 mil (0.14 mm) | 5.2 mil (0.13 mm) | 5.25 mil (0.13 mm) | 5.55 mil (0.14 mm) |
| Composite Basis Weight | 0.33 lb/yd2 (177 g/m2) | 0.28 lb/yd2 (150 g/m2) | 0.29 lb/yd2 (159 g/m2) | 0.30 lb/yd2 (163 g/m2) |
| Composite Density | 78 lb/ft3 (1.25 g/cc) | 70 lb/ft3 (1.12 g/cc) | 74 lb/ft3 (1.19 g/cc) | 72 lb/ft3 (1.15 g/cc) |
| MD Tensile Strength | 54.7 lb/in (95.7 N/cm) | 53.7 lb/in (94.0 N/cm) | 49.6 lb/in (86.8 N/cm) | 75.5 lb/in (132 N/cm) |
| MD Elongation | 3.4% | 2.8% | 2.7% | 3.4% |
| CD Tear Strength | 1.09 lb (496 g) | 1.19 lb (544 g) | 1.08 lb (488 g) | 0.952 lb (432 g) |
| MD Tear Strength | 0.370 lb (168 g) | 0.379 lb (172 g) | 0.370 lb (168 g) | 0.423 lb (192 g) |
| Dielectric Breakdown Strength | 271 V/mil (10.7 kV/mm) | 247 V/mil (9.7 kV/mm) | 258 V/mil (10.2 kV/mm) | 283 V/mil (11.1 kV/mm) |
| Retained Heat Aged MD Tensile Strength | 14.9 lb/in (26.1 N/cm) | 14.4 lb/in (25.2 N/cm) | 16.4 lb/in (28.7 N/cm) | 22.3 lb/in (39.0 N/cm) |
| Retained Heat Aged MD Elongation | 1.11% | 1.28% | 1.31% | 1.06% |

| EXAMPLE | 5 | 6 | 7 |
|---|---|---|---|
| Nonwoven Paper | XP-1 | NOMEX 411 | XP-1 |
| No. of Nonwoven Fabric Layers | 2 | 2 | 2 |
| Nonwoven Paper Thickness | 5.0 mil (0.13 mm) | 5.0 mil (0.13 mm) | 5.0 mil (0.13 mm) |
| Composite Calendering Temperature | 370-390° F. (188-199° C.) | 370-390° F. (188-199° C.) | 380° F. (188-199° C.) |
| Composite Calendering Pressure | 2500 pli (447 kg/cm) | 1000 pli (179 kg/cm) | 1000 pli (179 kg/cm) |
| Composite Calendering Speed | 60 ft/min (18 m/min) | 15 ft/min (4.6 m/min) | 15 ft/min (4.6 m/min) |
| Composite Thickness | 5.2 mil (0.13 mm) | 4.4 mil (0.11 mm) | 5.55 mil (0.14 mm) |
| Composite Basis Weight | 0.31 lb/yd2 (166 g/m2) | 0.24 lb/yd2 (129 g/m2) | 0.28 lb/yd2 (154 g/m2) |
| Composite Density | 78 lb/ft3 (1.25 g/cc) | 72 lb/ft3 (1.15 g/cc) | 68 lb/ft3 (1.09 g/cc) |
| MD Tensile Strength | 80 lb/in (140 N/cm) | 59.5 lb/in (104 N/cm) | 80 lb/in (140 N/cm) |
| MD Elongation | 3.5% | 5% | 2.5% |
| CD Tear Strength | 2.16 lb (980 g) | 1.13 lb (512 g) | 1.8 lb (800 g) |

TABLE 2-continued

| | | | |
|---|---|---|---|
| MD Tear Strength | 0.689 lb (312 g) | 0.564 lb (256 g) | 0.440 lb (200 g) |
| Dielectric Breakdown Strength | 348 V/mil (13.7 kV/mm) | 303 V/mil (11.9 kV/mm) | 478 V/mil (18.8 kV/mm) |
| Retained Heat Aged MD Tensile Strength | 30 lb/in (53 N/cm) | 23.6 lb/in (41.3 N/cm) | 36 lb/in (63 N/cm) |
| Retained Heat Aged MD Elongation | 1.3% | 3.9% | 1.1% |

Examples 8 to 18

Examples 8 to 18 include a nonwoven paper layer and one or two nonwoven fabric layers.

For Examples 8 to 13, the nonwoven paper layer was fed between two nonwoven fabric layers and calendered between steel rolls at the conditions shown in Table 3.

For Example 14, the construction was one layer of nonwoven paper and one layer of nonwoven fabric calendered between steel rolls at the conditions shown in Table 3.

For Examples 15 to 18, two layers of nonwoven paper were fed between two nonwoven fabric layers and calendered between steel rolls at the conditions shown in Table 3. For Example 15, two layers of THERMAVOLT LNC nonwoven paper were used, each having 7 mil (0.18 mm) nominal thickness. For Example 16, two layers of THERMAVOLT LNC nonwoven paper were used, each having nominal thickness of 9 mil (0.23 mm). For Example 17, one layer of THERMAVOLT LNC nonwoven paper with 7 mil (0.18 mm) nominal thickness and one layer of THERMAVOLT LNC nonwoven paper with nominal thickness 9 mil (0.23 mm) were used. For Example 18, one layer of THERMAVOLT LNC nonwoven paper with 5.5 mil (0.14 mm) nominal thickness and one layer of XP-1 nonwoven paper with 5.5 mil (0.14 mm) nominal thickness were used. The measurements and test results for Examples 8 to 18 are shown in Table 3.

TABLE 3

| EXAMPLE | 8 | 9 | 10 | 11 | 12 | 13 |
|---|---|---|---|---|---|---|
| Nonwoven Paper | THERMAVOLT LNC | THERMAVOLT LNC | XP-1 | THERMAVOLT LNC | THERMAVOLT LNC | XP-1 |
| No. of Nonwoven Fabric Layers | 2 | 2 | 2 | 2 | 2 | 2 |
| Nonwoven Paper Thickness | 9.0 mil (0.23 mm) | 9.0 mil (0.23 mm) | 9.0 mil (0.23 mm) | 12 mil (0.30 mm) | 12 mil (0.30 mm) | 12 mil (0.30 mm) |
| Composite Calendering Temp | 370-390° F. (188-199° C.) | 370-390° F. (188-199° C.) | 370-390° F. (188-199° C.) | 370-390° F. (188-199° C.) | 370-390° F. (188-199° C.) | 370-390° F. (188-199° C.) |
| Composite Calendering Pressure | 1000 pli (179 kg/cm) | 2500 pli (447 kg/cm) | 2500 pli (447 kg/cm) | 1000 pli (447 kg/cm) | 2500 pli (447 kg/cm) | 2500 pli (447 kg/cm) |
| Composite Calendering Speed | 15 ft/min (4.6 m/min) | 60 ft/min (18 m/min) | 60 ft/min (18 m/min) | 15 ft/min (4.6 m/min) | 30 ft/min (9.1 m/min) | 30 ft/min (9.1 m/min) |
| Composite Thickness | 7.7 mil (0.20 mm) | 7.1 mil (0.18 mm) | 7.35 mil (0.19 mm) | 9.3 mil (0.24 mm) | 9.5 mil (0.24 mm) | 9.55 mil (0.24 mm) |
| Composite Basis Weight | 0.45 lb/yd2 (244 g/m2) | 0.45 lb/yd2 (244 g/m2) | 0.44 lb/yd2 (240 g/m2) | 0.58 lb/yd2 (315 g/m2) | 0.57 lb/yd2 (311 g/m2) | 0.57 lb/yd2 (309 g/m2) |
| Composite Density | 78 lb/ft3 (1.3 g/cc) | 84 lb/ft3 (1.3 g/cc) | 80 lb/ft3 (1.3 g/cc) | 83 lb/ft3 (1.3 g/cc) | 80 lb/ft3 (1.3 g/cc) | 79 lb/ft3 (1.3 g/cc) |
| MD Tensile Strength | 72.3 lb/in (127 N/cm) | 75 lb/in (131 N/cm) | 93 lb/in (163 N/cm) | 84.3 lb/in (148 N/cm) | 104 lb/in (182 N/cm) | 110 lb/in (193 N/cm) |
| MD Elongation | 2.7% | 2.9% | 3.2% | 2.8% | 3.2% | 3.0% |
| CD Tear Strength | 1.27 lb (576 g) | 3.25 lb (1472 g) | 3.39 lb (1536 g) | 1.94 lb (880 g) | 3.46 lb (1568 g) | 3.53 lb (1600 g) |
| MD Tear Strength | 0.56 lb (256 g) | 0.92 lb (416 g) | 1.16 lb (528 g) | 0.97 lb (440 g) | 1.43 lb (648 g) | 1.55 lb (704 g) |
| Dielectric Breakdown Strength | 428 V/mil (16.9 kV/mm) | 475 V/mil (18.7 kV/mm) | 217 V/mil (8.5 kV/mm) | 405 V/mil (15.9 kV/mm) | 248 V/mil (9.8 kV/mm) | 251 V/mil (9.9 kV/mm) |
| Retained Heat Aged MD Tensile Strength* | 30 lb/in (53 N/cm) | 31 lb/in (55 N/cm) | 32 lb/in (56 N/cm) | 31 lb/in (55 N/cm) | 33 lb/in (58 N/cm) | 34 lb/in (60 N/cm) |
| Retained Heat Aged MD Elongation | 1.1% | 1.2% | 1% | 0.88% | 1.1% | 1% |

| EXAMPLE | 14 | 15 | 16 | 17 | 18 |
|---|---|---|---|---|---|
| Nonwoven Paper | THERMAVOLT LNC | THERMAVOLT LNC | THERMAVOLT LNC | THERMAVOLT LNC | THERMAVOLT LNC/XP-1 |
| No. of Nonwoven Fabric Layers | 1 | 2 | 2 | 2 | 2 |
| Nonwoven Paper Thickness | 3.5 mil (0.089 mm) | 12 mil (0.30 mm) | 18 mil (0.46 mm) | 14 mil (0.36 mm) | 11 mil (0.28 mm) |
| Composite | 370-390° F. | 375-390° F. | 380-385° F. | 390-405° F. | 380-385° F. |

TABLE 3-continued

| | | | | | |
|---|---|---|---|---|---|
| Calendering Temp | (188-199° C.) | (191-199° C.) | (193-196° C.) | (199-207° C.) | (193-196° C.) |
| Composite Calendering Pressure | 2500 pli (447 kg/cm) | 2500 pli (447 kg/cm) | 2500 pli (447 kg/cm) | 2500 pli (447 kg/cm) | 1000 pli (179 kg/cm) |
| Composite Calendering Speed | 60 ft/min (18 m/min) | 21 ft/min (6.4 m/min) | 21 ft/min (6.4 m/min) | 30 ft/min (9.1 m/min) | 15 ft/min (4.6 m/min) |
| Composite Thickness | 3.04 mil (0.08 mm) | 10.4 mil (0.26 mm) | 11.8 mil (0.30 mm) | 11.8 mil (0.30 mm) | 7.9 mil (0.20 mm) |
| Composite Basis Weight | 0.16 lb/yd2 (86 g/m2) | 0.66 lb/yd2 (358 g/m2) | 0.78 lb/yd2 (421 g/m2) | 0.73 lb/yd2 (395 g/m2) | 0.48 lb/yd2 (259 g/m2) |
| Composite Density | 72 lb/ft3 (1.2 g/cc) | 84 lb/ft3 (1.3 g/cc) | 87 lb/ft3 (1.4 g/cc) | 82 lb/ft3 (1.3 g/cc) | 81 lb/ft3 (1.3 g/cc) |
| MD Tensile Strength | 25.1 lb/in (43.9 N/cm) | 147 lb/in (257 N/cm) | 136 lb/in (238 N/cm) | 156 lb/in (273 N/cm) | 106 lb/in (186 N/cm) |
| MD Elongation | 1.9% | 3.3% | 3.4% | 3.7% | 3.1% |
| CD Tear Strength | 0.800 lb (362 g) | 2.37 lb (1074 g) | 2.60 lb (1178 g) | 3.10 lb (1408 g) | 1.83 lb (832 g) |
| MD Tear Strength | 0.32 lb (146 g) | 0.96 lb (435 g) | 1.13 lb (512 g) | 1.14 lb (518 g) | |
| Dielectric Breakdown Strength | 289 V/mil (11.4 kV/mm) | 565 V/mil (22.2 kV/mm) | 623 V/mil (24.5 kV/mm) | 559 V/mil (22.0 kV/mm) | 493 V/mil (19.4 kV/mm) |
| Retained Heat Aged MD Tensile Strength* | 9.4 lb/in (16 N/cm) | 65 lb/in (114 N/cm) | 65 lb/in (114 N/cm) | 63 lb/in (110 N/cm) | |
| Retained Heat Aged MD Elongation | 0.9% | 1.5% | 1.4% | 1.5% | |

*For Examples 15 and 17, thermal aging conditions were 10 days at 464° F. (240° C.).

Comparative Examples CE10 and CE11

Comparative Example CE10 contains a thermoplastic layer but no nonwoven fabric layers. Comparative Example CE11 contains an adhesive layer on each side of the interior paper layer.

Comparative Example CE10 was a sheet of standard THERMAVOLT TVF, with a 5+1 thickness (5 mil nonwoven paper layer thickness and 1 mil thickness PET layer thickness). Comparative Example CE11 was made by combining the nonwoven fabric layers and nonwoven paper layer using a styrene-acrylate adhesive with isocyanate cure agent. The adhesive was applied to each side of the XP-1 paper at the rate of 8 lb per 3000 sq ft (13 g per sq m) and dried at 200° F. (93.3° C.) for 1 minute. The paper was then combined with the nonwoven fabric layer through a steel/rubber nip at a pressure of 30 pli (5.4 kg/cm) and a temperature of 200° F. (93.3° C.) at a speed of 5 ft/min (1.5 m/min) to activate the adhesive and complete the bond.

The measurements and test results for Comparative Examples CE10 and CE11 are shown in Table 4.

Comparative Example CE11 showed minimal retained heat aged flexibility after heat aging. When folded at about a 135° angle, this sample cracked. When folded back the other direction and pulled, the sample broke cleanly at the fold. In contrast, Examples 1-22 did not show this behavior and retained good folding flexibility after heat aging.

TABLE 4

| | EXAMPLE | |
|---|---|---|
| | CE10 | CE11 |
| Nonwoven Paper | THERMAVOLT TVF, 5 + 1 | XP-1 |
| No. of Nonwoven Fabric Layers | N/A | 2 |
| Nonwoven Paper Thickness | 5.0 mil (0.13 mm) | 3.8 mil (0.097 mm) |
| Composite Thickness | 6 mil (0.15 mm) | 6.45 mil (0.16 mm) |
| Basis Weight | 0.43 lb/yd2 (234 g/m2) | 0.37 lb/yd2 (200 g/m2) |
| Density | 96 lb/ft3 (1.54 g/cc) | 76 lb/ft3 (1.22 g/cc) |
| MD Tensile Strength | 50 lb/in (88 N/cm) | 87.6 lb/in (153 N/cm) |
| MD Elongation | 2.2% | 4.5% |
| CD Tear Strength | 0.396 lb (180 g) | 0.950 lb (432 g) |
| MD Tear Strength | 0.290 lb (132 g) | 0.475 lb (216 g) |
| Dielectric Breakdown Strength | 1133 V/mil (44.6 kV/mm) | 630 V/mil (24.8 kV/mm) |
| Retained Heat Aged MD Tensile Strength | 16.2 lb/in (28.4 N/cm) | 42.8 lb/in (74.9 N/cm) |
| Retained Heat Aged MD Elongation | 0.7% | 1.4% |

Examples 19 to 22

Examples 19 to 22 include a nonwoven paper layer between two nonwoven fabric layers. The fabric layers have different compositions.

To make Examples 19 to 22, the paper layer was fed between two nonwoven fabric layers and calendered at the conditions shown in Table 5.

The measurements and test results for Examples 19 to 22 are shown in Table 5.

TABLE 5

| | EXAMPLE | | | |
|---|---|---|---|---|
| | 19 | 20 | 21 | 22 |
| Nonwoven Paper | XP-1 | XP-1 | XP-1 | XP-1 |
| No. of Nonwoven Fabric Layers | 2 | 2 | 2 | 2 |
| (Nonwoven Fabric) p-aramid | 0 wt % | 20 wt % | 40 wt % | 60 wt % |
| (Nonwoven Fabric) polyester staple fiber | 60 wt % | 40 wt % | 20 wt % | 0 wt % |
| (Nonwoven Fabric) undrawn polyester binder fiber | 40 wt % | 40 wt % | 40 wt % | 40 wt % |
| Nonwoven Paper Thickness | 5.0 mil (0.13 mm) | 5.0 mil (0.13 mm) | 5.0 mil (0.13 mm) | 5.0 mil (0.13 mm) |
| Composite Calendering Temp | 330-340° F. (166-171° C.) | 330-340° F. (166-171° C.) | 330-340° F. (166-171° C.) | 330-340° F. (166-171° C.) |
| Composite Calendering Pressure | 700 pli (125 kg/cm) | 700 pli (125 kg/cm) | 700 pli (125 kg/cm) | 700 pli (125 kg/cm) |
| Composite Calendering Speed | 15 ft/min (4.6 m/min) | 15 ft/min (4.6 m/min) | 15 ft/min (4.6 m/min) | 15 ft/min (4.6 m/min) |
| Composite Thickness | 4.3 mil (0.11 mm) | 4.25 mil (0.11 mm) | 3.95 mil (0.10 mm) | 4.25 mil (0.11 mm) |
| Composite Basis Weight | 0.25 lb/yd2 (135 g/m2) | 0.25 lb/yd2 (138 g/m2) | 0.24 lb/yd2 (128 g/m2) | 0.25 lb/yd2 (138 g/m2) |
| Composite Density | 78 lb/ft3 (1.25 g/cc) | 79 lb/ft3 (1.27 g/cc) | 79 lb/ft3 (1.27 g/cc) | 79 lb/ft3 (1.27 g/cc) |
| MD Tensile Strength | 24.1 lb/in (42.2 N/cm) | 35.7 lb/in (62.5 N/cm) | 36.2 lb/in (63.4 N/cm) | 45.6 lb/in (79.8 N/cm) |
| MD Elongation | 2.1% | 2.6% | 2.5% | 2.9% |
| CD Tear Strength | 0.370 lb (168 g) | 0.739 lb (336 g) | 0.669 lb (304 g) | 0.986 lb (448 g) |
| Dielectric Breakdown Strength | 344 V/mil (13.5 kV/mm) | 290 V/mil (11.4 kV/mm) | 392 V/mil (15.4 kV/mm) | 401 V/mil (15.8 kV/mm) |
| Retained Heat Aged MD Tensile Strength | 10.1 lb/in (17.7 N/cm) | 21.3 lb/in (37.3 N/cm) | 22.8 lb/in (39.9 N/cm) | 30.7 lb/in (53.7 N/cm) |
| Retained Heat Aged MD Elongation | 0.7% | 0.94% | 1.05% | 0.89% |

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. This application is intended to cover any adaptations or variations of the preferred embodiments discussed herein. Therefore, it is manifestly intended that this invention be limited only by the claims and the equivalents thereof.

What is claimed is:

1. An article comprising:
   a nonwoven paper layer directly fused on one or both sides with a nonwoven fabric layer wherein one or both of the nonwoven paper and nonwoven fabric are electrically insulating,
   wherein the nonwoven paper comprises:
      about 50 wt % to about 80 wt % of an inorganic filler selected from the group consisting of kaolin clay, talc, calcium carbonate, alumina trihydrate, montmorillonite, smectite, bentonite, illite, chlorite, sepiolite, attapulgite, halloysite, vermiculite, laponite, rectorite, perlite, aluminum nitride, silicon carbide, boron nitride, and combinations thereof, and
      about 3 wt % to about 10 wt % polymer latex binder, and
   wherein the nonwoven fabric comprises:
      about 20 wt % to about 70 wt % binder fibers, wherein the binder fibers comprise at least one of bicomponent binder fibers and undrawn binder fibers, and
      about 30 wt % to about 80 wt % staple fibers, wherein the staple fibers comprise para-aramid staple fibers.

2. The article of claim 1 having a composite part dielectric breakdown strength of greater than or equal to 150 volts/mil according to ASTM D149-09.

3. The article of claim 1 wherein the nonwoven paper further comprises aramid fibers.

4. The article of claim 3 wherein the aramid fibers of the nonwoven paper are one or both of para-aramid and meta-aramid fibers.

5. The article of claim 1 wherein the nonwoven paper further comprises about 10 to about 30 wt % aramid fibers.

6. The article of claim 1 wherein the nonwoven paper further comprises non-aramid fibers selected from the group consisting of polyphenylene sulfide, polyester, polyamides, acrylic, melamine, glass, and polyimide.

7. The article of claim 1 wherein the polymer latex binder is selected from the group consisting of acrylic latex, styrene acrylic latex, natural rubber latex, and combinations thereof.

8. The article of claim 1 wherein the binder fibers of the nonwoven fabric further comprise non-aramid fibers selected from the group consisting of polyphenylene sulfide, polyester, glycol-modified polyester, polyphenyl sulfone, polypropylene, and combinations thereof.

9. The article of claim 1 wherein of the nonwoven paper layer comprises more than one sheet of nonwoven paper.

10. The article of claim 1 wherein the nonwoven fabric layer comprises more than one sheet of nonwoven fabric.

11. The article of claim 1 comprising about 49 to about 95 wt % nonwoven paper and about 5 to about 51 wt % nonwoven fabric.

12. The article of claim 1 having one nonwoven paper layer and one nonwoven fabric layer, and comprising about 66 to about 95 wt % nonwoven paper and about 5 to about 34 wt % nonwoven fabric.

13. The article of claim 1 having one nonwoven paper layer between two nonwoven fabric layers, and comprising about 49 to about 93 wt % nonwoven paper and about 7 to about 51 wt % nonwoven fabric.

* * * * *

UNITED STATES PATENT AND TRADEMARK OFFICE
CERTIFICATE OF CORRECTION

PATENT NO. : 9,437,348 B2
APPLICATION NO. : 13/069679
DATED : September 6, 2016
INVENTOR(S) : Robert Turpin Page 1 of 1

It is certified that error appears in the above-identified patent and that said Letters Patent is hereby corrected as shown below:

Column 19
Line 1, In Claim 10, delete "claiml" and insert -- claim 1 --, therefor.

Signed and Sealed this
Fourth Day of April, 2017

Michelle K. Lee
*Director of the United States Patent and Trademark Office*